United States Patent [19]

Göeller, Jr.

[11] 3,912,867

[45] Oct. 14, 1975

[54] FOUR-WIRE CONFERENCE CIRCUIT

[75] Inventor: Leopold Frederick Goeller, Jr., Haddonfield, N.J.

[73] Assignee: RCA Corporation, New York, N.Y.

[22] Filed: May 13, 1974

[21] Appl. No.: 469,328

[52] U.S. Cl......... 179/1 CN; 179/18 AF; 179/18 BC

[51] Int. Cl.²........................................... H04M 3/56

[58] Field of Search......... 179/1 CN, 18 BC, 18 AF, 179/170 D

[56] References Cited

UNITED STATES PATENTS

| | | | |
|---|---|---|---|
| 3,527,889 | 9/1970 | Nennerfelt | 179/1 CN |
| 3,544,726 | 12/1970 | Wimberly | 179/18 BC |
| 3,622,708 | 11/1971 | Guenther et al. | 179/18 BC |

FOREIGN PATENTS OR APPLICATIONS

| | | | |
|---|---|---|---|
| 561,531 | 10/1928 | Germany | 179/1 CN |
| 682,630 | 5/1930 | France | 179/1 CN |

*Primary Examiner*—Thomas W. Brown
*Attorney, Agent, or Firm*—Edward J. Norton; Carl M. Wright; Joseph S. Tripoli

[57] ABSTRACT

A four-wire conference circuit for providing signal transmission between one pair of receive conductors associated with a four-wire circuit and two other pairs of transmit conductors associated with two other four-wire circuits. The conference arrangement utilizes hybrid circuits interconnected such that the receive pair of any given one of several four-wire circuits may transfer signals to the transmit pairs of more than one additional four-wire circuit without injecting these signals into its own transmit pair of conductors. This conference capability can be made part of the four-wire trunk circuits by slight modification to the equipment which is normally part of these circuits.

5 Claims, 9 Drawing Figures

FOUR-WIRE CONFERENCE CIRCUIT

The present invention relates generally to four-wire conference circuits and more particularly to four-wire conference circuits utilizing hybrid circuits.

In the telephony art there are, basically, two types of transmission systems, i.e. two-wire and four-wire systems. In a two-wire system, telephone conference calls may be accomplished at the expense of signal level by simply bridging on extra parties. In a four-wire system, each user instrument or station has associated therewith a pair of transmit conductors and a pair of receive conductors isolated from one another. When one user is connected to a second user, the transmit pair of conductors of the first user is coupled, through the system, to the receive pair of conductors of the second user. Similarly, the transmit pair of conductors associated with the second user is coupled to the receive pair of conductors of the first user. Simple bridging to add more parties to the call, as in the two-wire case, is not possible in a four-wire system because the addition of a third party's receive pair to the transmit pairs of the two originating parties and the third party's transmit pair to the receive pairs of the two originating parties shorts out the entire arrangement.

A popular approach to conferencing in a four-wire system is the utilization of a resistive cube-like bridge. Such an arrangement is found in U.S. Pat. No. 3,622,708. These resistance-cube bridges typically demonstrate 15 db of loss between coupled ports and something like 70 db of isolation between a particular receive port from a user and the conjugate port which transmits to that user. If 15 db of gain is injected in the transmit ports to make up for the loss, then the isolation of the receive port from its conjugate transmit port approaches something like 55 db.

The present invention provides a four-wire conference circuit where the loss is, ideally, only 6 db while the isolation of conjugate ports remains quite high. The conference circuit of the present invention is accomplished with the use of hybrid circuits. Some typical arrangements for hybrid circuits may be found in U.S. Pat. No. 2,947,952.

One of the important advantages of the present invention is that the hybrid circuits used to effect the conference circuit may, if desired, be constructed from the two transformers found in the transmission path of a typical four-wire trunk circuit by simple modification of the two transformers. The hybrids may then be interconnected, in accordance with the teachings of the present invention, by means of a switching matrix and a connection circuit. This becomes especially advantageous in a four-wire private automatic branch exchange (PABX) or a four-wire toll switch where a frequent requirement for a conference circuit exists between an operator and the calling and called parties. In such systems, the trunk transformers are available for modification and the switching matrix associated therewith facilitates the interconnections as required between the hybrids in the circuits which are to be put in a conference connection.

In accordance with the present invention there is provided a four-wire conference circuit comprising first, second and third hybrid circuits. Each hybrid has associated therewith first, second, third and fourth ports. Each hybrid circuit provides signal transmission from the first port to the corresponding third and fourth ports while greatly attenuating the signal to the second port. The first port of each hybrid circuit is adapted for connection to a corresponding signal receive circuit, and the second port of each hybrid circuit is adapted for connection to a corresponding signal transmit circuit. In addition, there is provided a means for interconnecting the third and fourth ports among the three hybrids such that signal transmission is accomplished between any given one of the first ports and all of the second ports excluding the second port associated with the given one of the first ports.

Figure 1:
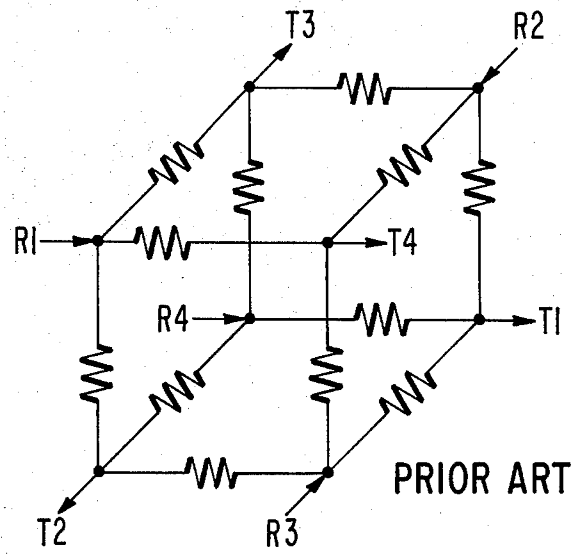
FIG. 1 is a schematic drawing of a prior art resistance cube bridge used for a four-wire conference circuit.

Referring more to FIG. 1, an example of a resistive-cube bridge arrangement, well known in the prior art, is shown. The arrangement shown in FIG. 1 is single sided for simplicity; ordinarily each of the conductors associated with a transmit or receive circuit, T or R, would comprise a pair of conductors in a four-wire conference circuit. At each corner of the cube, one of the transmit lines associated with circuits T1-T4 leaves the cube or one of the receive lines associated with circuits R1-R4 enters the cube. It will be noted that for each transmit corner, the associated receive corner or associated conjugate is located diagonally across the cube. This arrangement keeps any given receive corner, which receives signals from the four-wire system from transmitting to its conjugate transmit corner by virtue of the symmetry of the cube, although it can transmit signals to all other transmit corners equally well.

Transmission losses associated with resistance bridges, such as that shown in FIG. 1, are one of the motivating factors for seeking out a different arrangement for providing four-wire conference circuits. It has been found that hybrid circuits provide a convenient basic element for the construction of a four-wire conference circuit in accordance with the present invention.

Figure 2:
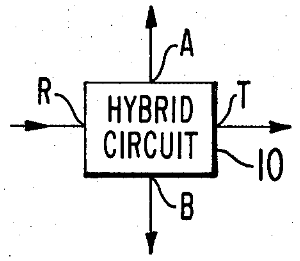
FIG. 2 is a block diagram representation of a hybrid circuit.

FIG. 2 is a block diagram of a hybrid circuit 10. The properties of a hybrid circuit, such as 10, are as follows. When an input signal is provided on one input port, such as R, that signal will divide equally between the two adjacent ports, such as ports A and B respectively, and very little, if any, of the input signal will reach the output port on the opposite side of the hybrid, such as port T. There are many circuit arrangements which will provide this type of signal division. Likewise, signals provided at port A will reach ports R and T but not B, signals provided at port B will reach ports R and T but not A, and signals provided at port T will reach ports A and B but not R.

Figure 3:
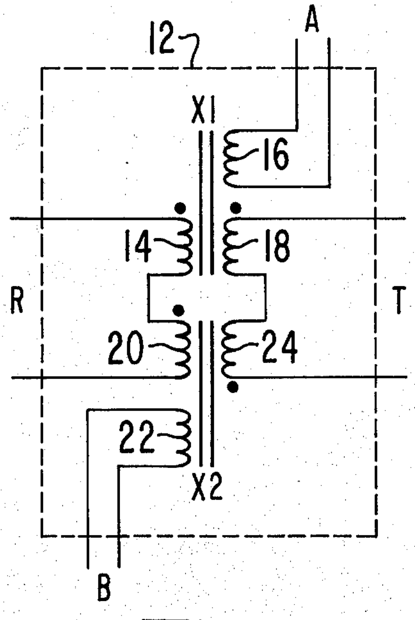
FIG. 3 is a diagram of a typical two transformer hybrid circuit.

The hybrid circuit 12 shown in FIG. 3 is known in the prior art and is referred to as a two-transformer hybrid. The two transformers are X1 and X2. Transformer X1 has a primary winding 14 and two secondary windings 16 and 18. Transformer X2 has two primary windings 20 and 22 and one secondary winding 24. One end of winding 14 is electrically connected to one end of winding 20. The other end of winding 14 and the other end of winding 20 are coupled to conductors which may be thought of as being associated with the receive port R of the hybrid circuit 12.

The conductors coupled to the secondary winding 16 of transformer X1 may be thought of as forming the pair of conductors associated with output port A of the hybrid 12, and the pair of conductors connected to winding 22 of transformer X2 may be thought of as the pair of conductors associated with output port B of the hybrid 12.

One end of winding 18 is connected to one end of winding 24. The other end of winding 18 and the other end of winding 24 are connected to a pair of conductors which may be thought of as being associated with the transmit port T of the hybrid circuit 12.

The magnetic coupling of the various windings of transformers X1 and X2 as shown by the dot notation in FIG. 3 provides the hybrid circuit action as previously described. That is, when a signal is injected onto the receive pair of conductors associated with port R, half of the signal energy will be transformer coupled to the conductors related to port A and half of the signal strength will be coupled to the conductors related to port B. It will be seen that the signals induced in windings 18 and 24 will cancel each other, by virtue of the dot notation, so that ideally none of the signal provided on the receive pair of conductors related to port R should reach the transmit pair of conductors related to port T.

Figure 4:
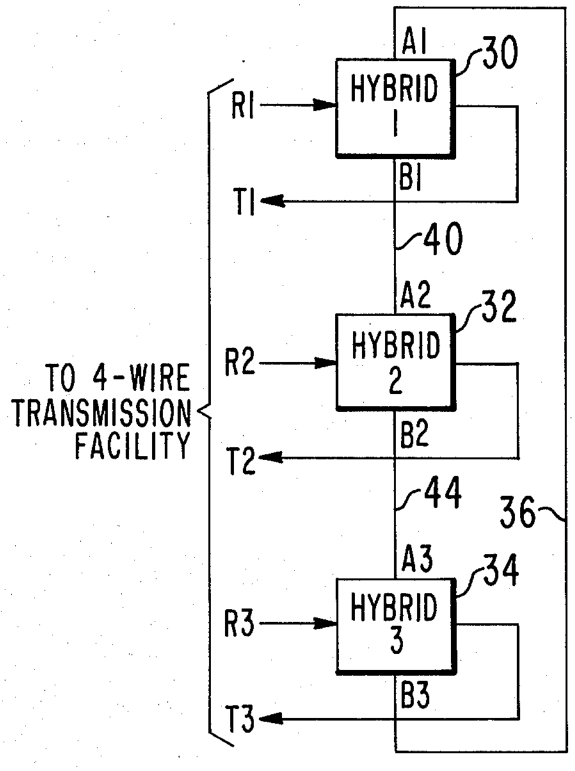
FIG. 4 is a block diagram of three hybrid circuits arranged in accordance with the present invention.

Referring now to FIG. 4, three hybrid circuits 30, 32 and 34 are shown connected in a conference arrangement. Each of the hybrid circuits 30, 32 and 34 has a corresponding receive signal port R1, R2 and R3 respectively. Signals from the four-wire transmission facility are provided via pairs of wires to these ports of the hybrids 30, 32 and 34. Signals translated through the hybrids 30, 32 and 34 are then transmitted back to the four-wire transmission facility from ports T1, T2 and T3 respectively via other pairs of wires.

In the arrangement of FIG. 4, hybrid 30 has one adjacent port A1 connected via a pair of conductors 36 to port B3 of hybrid 34. The other adjacent port B1 of hybrid 30 is connected via a pair of conductors 40 to port A2 of hybrid 32. Port B2 of hybrid 32 is connected via a pair of conductors 44 to port A3 of hybrid circuit A3.

The operation of the arrangement of FIG. 4 is as follows. A signal is received at port R1 of hybrid 30 from the four-wire transmission facility and this signal is split in hybrid 30. A portion thereof is made available at each of the ports A1 and B1. The signal levels at ports A1 and B1 are typically 3 db down from the signal arriving at port R1. The signal at port A1 is coupled to port B3 of hybrid 34 via the pair of conductors 36 and the signal at port B1 is coupled to port A2 of hybrid 32 via the pair of conductors 40. The signal appearing at port B3 is split in hybrid 34 and signals, which are 3 db down from the signal at port B3, appear at ports R3 and T3 of hybrid 34. The signal appearing at port A2 is split in hybrid 32 and signals, which are 3 db down from the signal at port A2, appear at ports R2 and T2 of hybrid 32. Thus, the information contained in the signal coupled to port R1 is transmitted to ports T2 and T3 but not to port T1. The signals which appear at ports R2 and R3 are of no concern since the conductors associated with these ports will normally have a unidirectional amplifier associated therewith in a sense which would block and absorb signals going out of ports R2 and R3 without affecting signals coming into ports R2 and R3. In a similar manner, signals coming into port R2 will be coupled to ports T1 and T3, but not to port T2 and signals coming into port R3 will be coupled to ports T1 and T2, but not to port T3.

Figure 5:
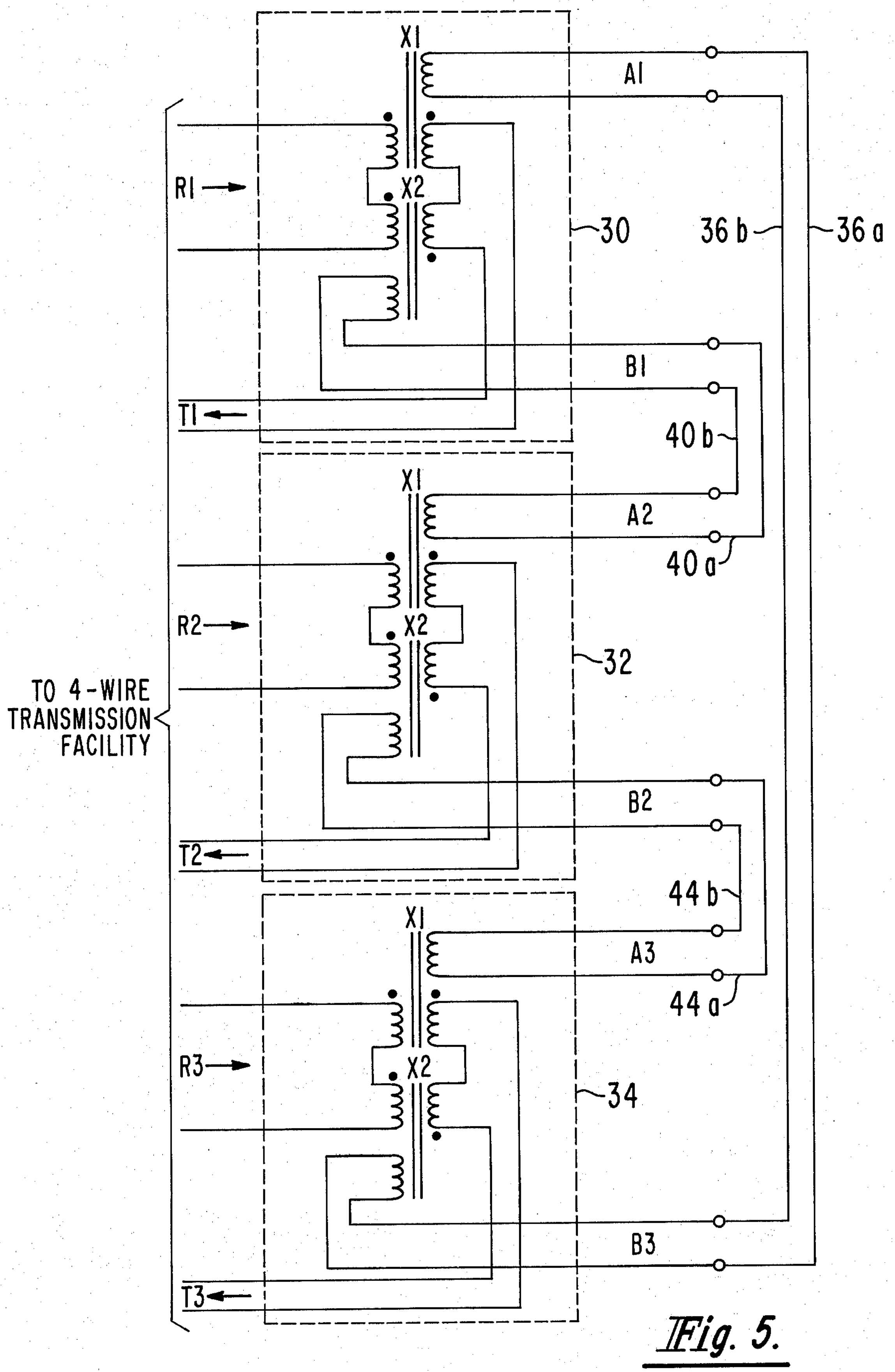
FIG. 5 is a circuit diagram of three twotransformer hybrid circuits arranged in accordance with the present invention.

Referring now to FIG. 5, the three hybrid circuits 30, 32 and 34 are drawn out to illustrate the utilization of the two-transformers, X1 and X2 from FIG. 3, in each of the hybrids shown in FIG. 4. In FIG. 5, port A1 is connected to port B3 via conductors *36a* and *36b*, port B1 is connected to port A2 via conductors *40a* and *40b* and port B2 is connected to port A3 via conductors *44a* and *44b*. The conductors associated with ports R1, R2, R3, T1, T2, and T3, are ultimately returned to their respective four-wire transmission facilities.

Figure 6:
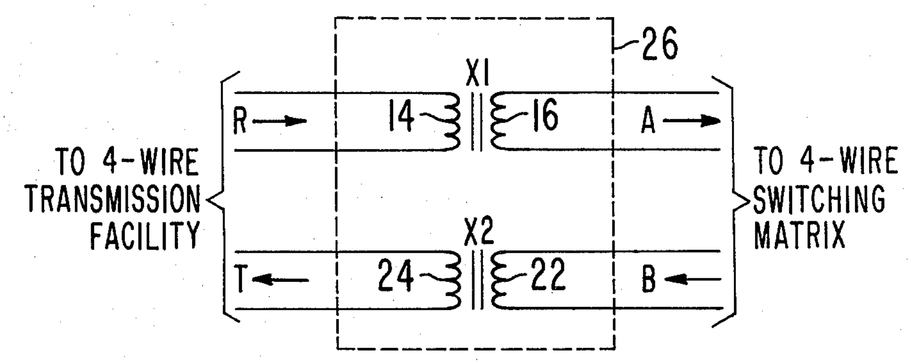
Fig. 6. PRIOR ART
FIG. 6 is a circuit drawing showing the transmission circuitry of a typical two-transformer trunk circuit found in a four-wire system.

Referring now to FIG. 6, a two-transformer X1, X2, arrangement for a trunk circuit 26 is shown. The transformers shown in FIG. 4 are normally found in the transmission circuit of a four-wire trunk circuit. The primary winding 14 of transformer X1 is coupled to the receive pair of conductors associated with access port R and the secondary winding 16 of transformer X1 is coupled to a pair of conductors associated with access port A. The primary winding 24 of transformer X2 is coupled to the transmit pair of conductors associated with access port T. The secondary winding 22 of transformer X2 is coupled to a pair of conductors associated with access port B. The reason for using the same numerical designations for windings shown in FIG. 6 and in FIG. 3 will soon be apparent. In the typical four-wire system, the transmit path for signals is kept completely separate from the receive path as shown in FIG. 6. In a four-wire PABX, or toll switch, conductors A and B would ordinarily go to a four-wire switching matrix. The conductors T and R would go to a four-wire transmission facility.

Figure 7:
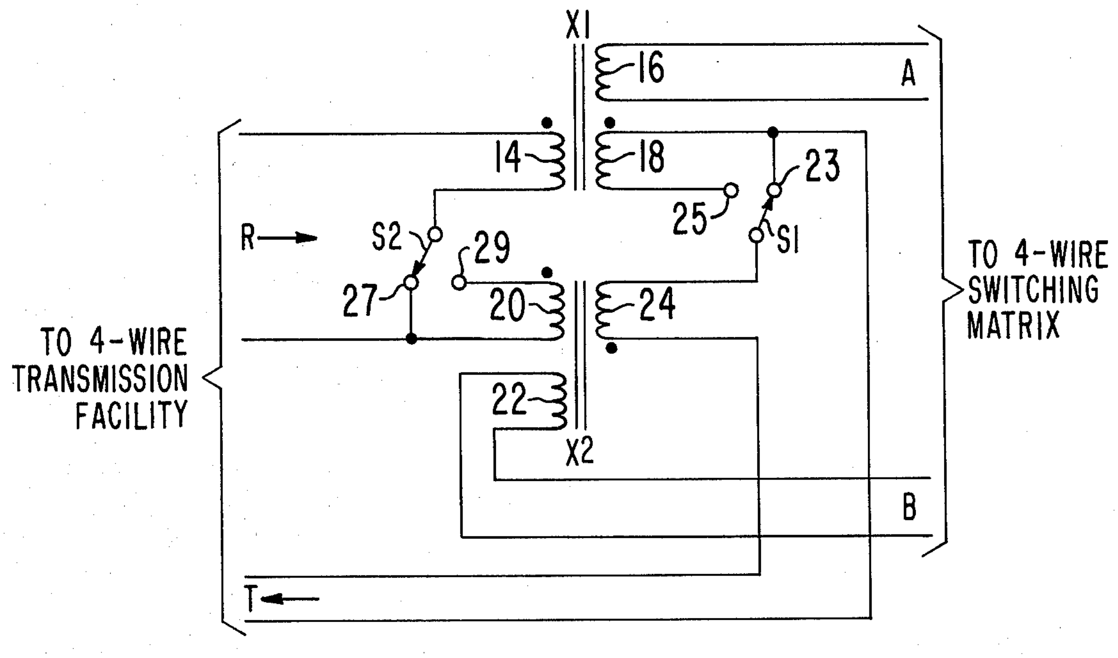
FIG. 7 is a schematic drawing showing the manner in which the trunk circuit of FIG. 6 can be altered to become a hybrid circuit having the characteristics described in relation to FIG. 3.

One of the advantages of the present invention is the ability to convert by relatively minor modification the two-transformer trunk circuit 26 of FIG. 6 into the two-transformer hybrid circuit 12 of FIG. 3. FIG. 7 demonstrates one way for conveniently providing the aforementioned modification.

In FIG. 7 the same notation is used for the various windings and ports as shown in FIGS. 3 and 6. In FIG. 7, it will be seen that the two transformers, X1 and X2, having windings 14, 16, 22 and 24, are already available in the two-transformer trunk circuit 26 shown in FIG. 6. Winding 16 of transformer X1 is associated with port A. Winding 22 of transformer X2 is associated with port B. Ports A and B are brought out via pairs of conductors to a four-wire switching matrix. The modifications to the trunk circuit 26 comprise the addition of a secondary winding 18 on transformer X1, the addition of a winding 20 on the primary side of transformer X2, and the addition of transfer switches S1 and S2.

Switch S1 and switch S2 are preferably formed from the contacts of a relay. Switch S1 has contact terminals 23 and 25 associated therewith. Switch S2 has contact terminals 27 and 29 associated therewith. Contact point 23 is connected to one end of winding 18 and contact point 25 is connected to the other end of winding 18. Contact point 27 is connected to one end of winding 20 and contact point 29 is connected to the other end of winding 20. Winding 24 is connected on one end to transfer switch S1. The other end of winding 24 is connected to one of the two conductors associated with port T. Contact point 23 is connected to the other conductor associated with port T. Winding 14 is connected on one end to one of the two conductors associated with port R. Contact point 27 is connected to the other conductor associated with port R. The pairs of conductors associated with ports R and T are brought out to the four-wire transmission facility and the conductors associated with ports A and B are brought out to a four-wire switching matrix.

It will now be seen that under normal operating conditions with the operating arms of switches S1 and S2 in contact with points 23 and 27 respectively, the circuit of FIG. 7 looks exactly like the circuit 26 shown in FIG. 6. That is, windings 18 and 20 are out of the circuit of FIG. 7. However, when the arms of switches S1 and S2 are operated, for example by energizing a relay, contact points 25 and 29 are connected in the circuit. Now, the circuit of FIG. 7 will look exactly like the hybrid circuit 12 shown in FIG. 3. In the circuit of FIG. 7, both of the switches S1 and S2 and the contact points 23, 25, 27 and 29 may be a single relay, or, if desired, two relays may be utilized for this purpose.

Figure 8:
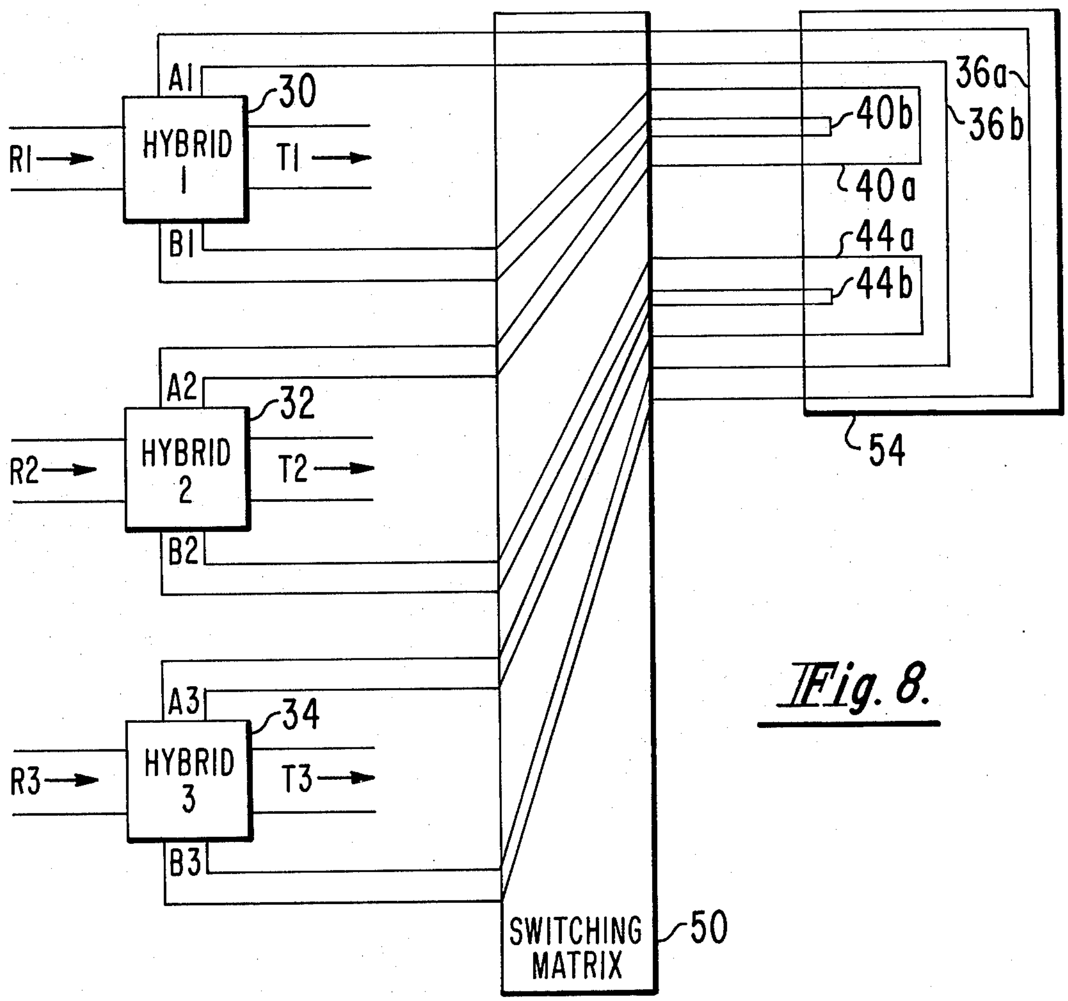
FIG. 8 is a block diagram showing the interconnection of three hybrid circuits via a switching matrix and a conference connection circuit.

Referring now to FIG. 8, the three hybrid circuits 30, 32 and 34 are shown with the conductors associated with ports A1, B1, A2, B2, A3 and B3 brought out to a four-wire switching matrix 50. Switching matrix 50 is typically found in a four-wire PBX and/or in four-wire toll systems. The switching matrix 50 is such that the connections shown therein are controlled and selectable. The actual paths for the electrical connections from one end of the matrix to the other may be quite complex and may even be accomplished through several switching matrices cascaded together. The important point to be noted is that the switching matrix 50 is available in such a system for selectively continuing the electrical paths associated with the A and B ports of the hybrid circuits 30, 32 and 34.

Also connected to the switching matrix 50 is a conference circuit connection device 54. Device 54 includes conductors **36*a***, 36*b*, 40*a*, 40*b*, 44*a* and **44*b*. Now it will be seen that by the appropriate setting of the switching matrix 50, the hybrid circuits 30, 32 and 34 are interconnected via the conductors in device 54 to form the overall conference arrangement shown in FIG. 5**.

It will be noted that the arrangement of FIG. 8 is quite flexible. With such an arrangement any other three hybrids in the overall system may be selectively switched into a conference situation via the appropriate switch commands to the matrix 50 in combination with the use of the conductors in device 54. Thus, in a particular system a given device such as 54 may serve many more than three stations or users since it is unlikely that all users would require conference connections at the same time.

Figure 9:
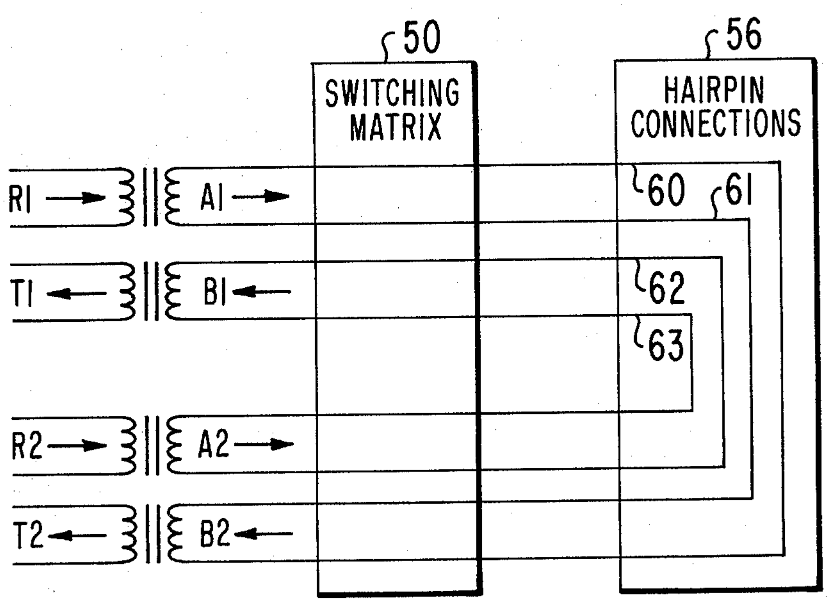
Fig. 9. PRIOR ART
FIG. 9 is a circuit diagram showing the conventional connection of two transmission facilities via a switching matrix and a connection circuit in a four-wire system.

Referring now to FIG. 9, when the switches S1 and S2 are de-energized, a hybrid circuit such as that of FIG. 7 is made to look like the trunk circuit 26 of FIG. 6. The electrical paths associated with the A and B ports may then be switched so as to provide the conventional connection of one user to another in a four-wire system. In this case, the switching matrix 50 provides electrical connections between the A and B ports of users 1 and 2 and a hairpin connection device 56. Device 56 comprises four wires 60-63. By appropriately switching the matrix 50, the receive side or path of user 1 is connected via lines 60 and 61 to the transmit side or path of user 2. Similarly, the transmit side or path of user 1 is connected via lines 62 and 63 to the receive side or path of user 2. Thus, with the appropriate operation of switches S1 and S2 and the appropriate selections of paths in matrix 50 in combination with the use of device 56, one may return to the conventional four-wire interconnection of two users over separate transmit and receive circuits. In a system such as that described, it is advantageous to have one or more devices such as 54 and several devices such as 56 all connected to the matrix 50.

Thus, it has been shown how hybrid circuits may be utilized to form a four-wire conference circuit having lower losses than the losses associated with a conventional resistive-cube circuit. In addition, it has been shown how a conventional four-wire trunk circuit may be modified so as to selectively operate as a hybrid circuit. Finally, it has been demonstrated how these hybrid circuits may be used in conjunction with a switching matrix and certain connection devices so that the circuits described may be switched from a conferencing arrangment to a conventional four-wire connection between users.

What is claimed is:

1. A four-wire conference circuit comprising:

first, second and third hybrid circuits each having first, second, third and fourth ports, each of said hybrid circuits providing signal coupling from one port to two other ports associated therewith, the first port of each hybrid circuit being connected to the receive side of a four-wire transmission facility, the second port of each hybrid circuit being connected to the transmit side of said fourwire transmission facility;

first means for connecting the fourth port of the first hybrid circuit to the third port of the second hybrid circuit;

second means for connecting the fourth port of the second hybrid circuit to the third port of the third hybrid circuit; and third means for connecting the fourth port of the third hybrid circuit to the third port of the first hybrid circuit;

the connections of said ports providing substantial signal coupling between any given one of said first ports and all of the non-associated second ports, the second port associated with said given first port having a substantially lower signal level coupled thereto.

2. The four-wire conference circuit according to claim 1 wherein each of said hybrid circuits comprises:

a first transformer having a primary winding and two secondary windings, said primary winding thereof being connected in circuit with said first port, one of the secondary windings of said first transformer being connected in circuit with said third port;

a second transformer having two primary windings and a secondary winding, one primary winding thereof being connected in circuit with said fourth port, said secondary winding thereof being connected in circuit with said second port;

means for connecting the other primary winding of said second transformer in circuit with said first port; and means for connecting the other secondary winding of said first transformer in circuit with said second port.

3. The four-wire conference circuit according to claim 2 wherein each of said two-transformer hybrid circuits further comprises:

first switching means selectively operable for switching said other primary winding of said second transformer in series circuit with the primary winding of said first transformer; and second switching means selectively operable for switching the other secondary winding of said first transformer in series circuit with the secondary winding of said second transformer.

4. The four-wire conference circuit according to claim 3 wherein said first and second switching means comprise relay contacts.

5. The four-wire conference circuit according to claim 4 wherein said first, second and third means each comprise individual conductive paths through a switching matrix and a connection device connected to said switching matrix, said connection device comprising a plurality of fixed conductive paths.

* * * * *